United States Patent
Wagner et al.

(10) Patent No.: US 8,779,284 B2
(45) Date of Patent: Jul. 15, 2014

(54) OPEN BACK BOX WITH GROUND SCREW BUMP

(75) Inventors: William Wagner, Murrysville, PA (US); John Mure, McKees Rocks, PA (US); Ryan Crouthamel, Pittsburgh, PA (US)

(73) Assignee: Cooper Technologies Company, Houston, TX (US)

( * ) Notice: Subject to any disclaimer, the term of this patent is extended or adjusted under 35 U.S.C. 154(b) by 229 days.

(21) Appl. No.: 13/235,112

(22) Filed: Sep. 16, 2011

(65) Prior Publication Data

US 2012/0067612 A1   Mar. 22, 2012

Related U.S. Application Data

(60) Provisional application No. 61/384,043, filed on Sep. 17, 2010.

(51) Int. Cl.
*H01J 5/00* (2006.01)
*H01J 15/00* (2006.01)
*H02G 3/08* (2006.01)
*H05K 5/00* (2006.01)

(52) U.S. Cl.
USPC .......................................................... 174/50

(58) Field of Classification Search
None
See application file for complete search history.

(56) References Cited

U.S. PATENT DOCUMENTS

| | | | | |
|---|---|---|---|---|
| 3,919,458 A | * | 11/1975 | Perrault et al. | 174/51 |
| 4,082,915 A | * | 4/1978 | Silver | 174/51 |
| 4,263,472 A | * | 4/1981 | Maheu | 174/51 |
| 4,882,647 A | * | 11/1989 | Collins | 361/119 |
| 5,448,012 A | * | 9/1995 | Jacob | 174/53 |
| 6,066,803 A | * | 5/2000 | Hagarty | 174/50 |
| 6,191,362 B1 | * | 2/2001 | Gretz | 174/58 |
| D441,719 S | | 5/2001 | Lew | |
| 6,369,323 B1 | * | 4/2002 | Wright | 174/51 |
| D461,455 S | * | 8/2002 | Forbes | D13/152 |
| D462,664 S | * | 9/2002 | Roesch et al. | D13/152 |
| D468,697 S | | 1/2003 | Straub, Jr. | |
| 6,653,561 B2 | * | 11/2003 | Lalancette et al. | 174/50 |
| 6,825,414 B2 | * | 11/2004 | Vagedes | 174/58 |
| D510,323 S | | 10/2005 | Hawken | |
| 7,126,058 B2 | * | 10/2006 | Herth | 174/58 |

(Continued)

OTHER PUBLICATIONS

Cooper Crouse-Hinds, Brochure PRE-formance Giving you the convenience of a pre-fabricated product—plus the flexibility to accommodate job-site requirements, 2007, p. 1-20, Cooper Industries, Inc., USA.

(Continued)

*Primary Examiner* — Hoa C Nguyen
*Assistant Examiner* — Xanthia C Cunningham
(74) *Attorney, Agent, or Firm* — King & Spalding LLP

(57) ABSTRACT

The disclosure herein provides for an electrical device housing that includes a protrusion, or bump, for securing a electrical ground wire to the housing. The housing may include a plurality of walls defining an interior space for housing the electrical device, including at least one side wall and a back wall orthogonal to the at least one side wall. The back wall may include an opening configured to allow access to the interior space of the housing. A protrusion may extend forward from the back wall into the interior space of the housing, and may include a mounting surface offset from the back wall in a direction toward the interior space of the housing, and a hole formed in the mounting surface for receiving a fastener to secure a ground wire to the housing.

19 Claims, 6 Drawing Sheets

(56) References Cited

U.S. PATENT DOCUMENTS

| | | | |
|---|---|---|---|
| 7,148,420 B1* | 12/2006 | Johnson et al. | 174/58 |
| D553,574 S | 10/2007 | Neveu | |
| 7,449,633 B2* | 11/2008 | Lalancette et al. | 174/58 |
| 7,563,978 B2* | 7/2009 | Lalancette et al. | 174/58 |
| 7,825,336 B2* | 11/2010 | Peck | 174/53 |
| 7,997,925 B2* | 8/2011 | Lam et al. | 439/535 |
| D679,252 S* | 4/2013 | Wagner et al. | D13/152 |
| 2001/0022232 A1* | 9/2001 | Ichikawa et al. | 174/50 |
| 2002/0011345 A1* | 1/2002 | Reiker | 174/50 |
| 2002/0066581 A1* | 6/2002 | Bashford | 174/50 |
| 2002/0095887 A1* | 7/2002 | Cole et al. | 52/220.8 |
| 2002/0125029 A1* | 9/2002 | Hussaini | 174/50 |
| 2002/0134568 A1* | 9/2002 | Dinh et al. | 174/50 |
| 2003/0205396 A1* | 11/2003 | Rumsey et al. | 174/50 |
| 2006/0289192 A1* | 12/2006 | Johnson et al. | 174/53 |
| 2008/0156510 A1* | 7/2008 | Yan | 174/50 |
| 2010/0084184 A1* | 4/2010 | Phillips | 174/535 |

OTHER PUBLICATIONS

Cooper Crouse-Hinds, Brochure PRE-formance complete a Complete Engineered Pre-Fabricated Solution, 2008, p. 1-6, Cooper Industries, Inc., USA.

United MFG Industries Inc. (UMI), Product Sheet 4S Deep Boxes, 2010, 1 page, Catalog 34 A9, Orbit Industries, Inc. (www.orbitelectric.com).

Thomas & Betts, Steel City product sheet, 2010, 1 page, U.S. Electrical On-line Catalog T&B Catalog No. X1-1/2 3/4, Thomas and Betts (www.tnb.com).

* cited by examiner

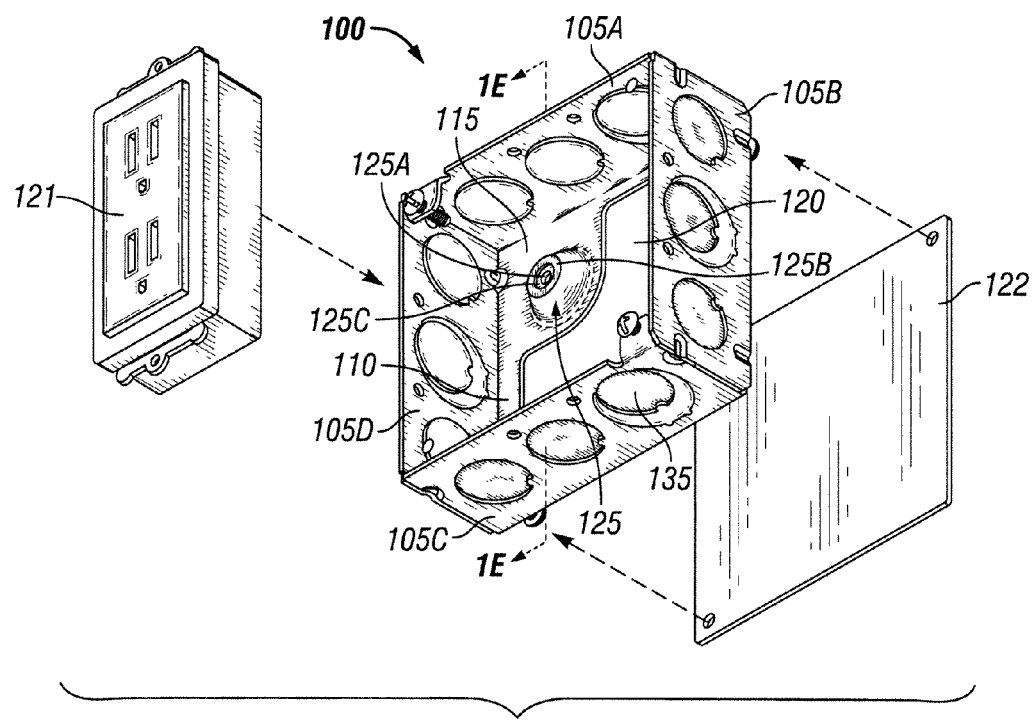
*FIG. 1A*
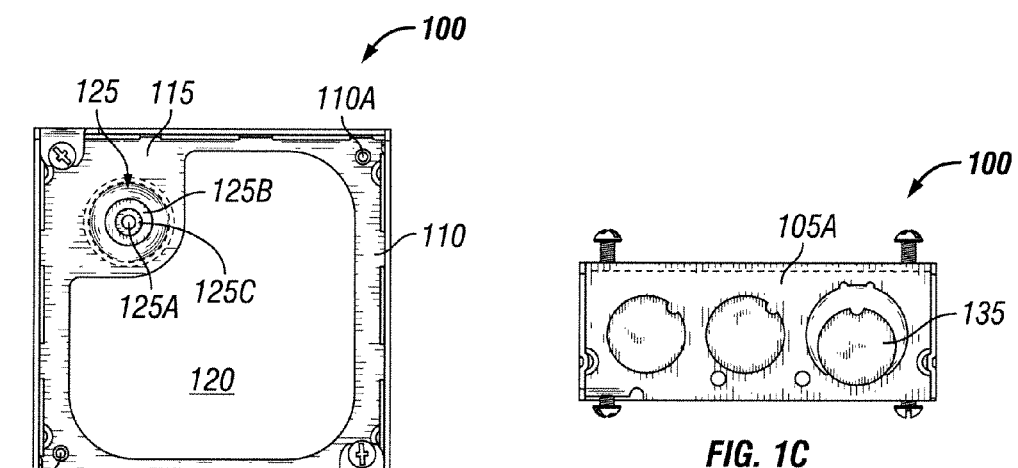
*FIG. 1B*
*FIG. 1C*

OPEN BACK BOX WITH GROUND SCREW BUMP

RELATED APPLICATION

The present application claims priority to and incorporates herein in its entirety U.S. Provisional Patent Application Ser. No. 61/384,043, titled "Open Back Box With Ground Screw Bump," filed on Sep. 17, 2010.

TECHNICAL FIELD

The present application relates generally to an electrical box, housing, can, or receptacle having a bump or protrusion configured to accommodate a ground screw.

BACKGROUND

An electrical housing, receptacle, housing, or box may have a removable back panel or cover (also known as an "open back" box). When installing a switch, outlet, or other electrical device in an open back box, a ground wire (for example, 10, 12, or 14 AWG copper wire) is often connected from the device (for example, a switch) to the box. Generally, the wire is wrapped around a screw. The ground screw, according to regulations, cannot be used for any purpose other than grounding.

Some conventional boxes come pre-assembled, which typically requires the electrician to disassemble the box in order to complete the wiring. To address this problem, electricians used an "extension ring," which includes an open back and also means to close the opening, to gain access to the box from the back in order to complete the wiring connections. However, such technique did not address the problem of how to complete the grounding requirements of the national electrical Code (NEC), which requires the ground wire to be attached to the box without leaving any extraneous openings, and without attaching the ground wire to the removable back panel.

In another conventional method, a grounding clip is secured to a side wall of the box. The grounding clip is generally a U-shaped metal clip that applies pressure from opposing ends to attempt to remain secure along the side wall. A ground wire is fed to the grounding clip and a tool, such as a screwdriver, can be used to force the grounding clip and wire onto an edge of a side wall of the box. The grounding clip and wire are then compressed with the tool to avoid interfering with the device (for example, switch) being installed in the box. Due to the pressure exerted on the clip, installation of a grounding clip can be challenging. Also, grounding clips can only be used for termination of a wire, not connecting two ground wires. Additionally, grounding clips may disengage from the box, may be lost or dropped during installation, and are an additional part that must be added to the box.

SUMMARY

Some embodiments of the invention provide a ground screw hole in a raised protrusion or bump in the back of the box. The raised bump may allow the screw to be installed without protruding beyond the back of the box. During a preassembly process the ground wire can be attached to the box using the ground screw hole provided in the raised bump. Further, in some embodiments multiport wire connectors are supplied, allowing the electrician to simply plug in the circuit ground wire to the connector, thus completing the circuit wiring, and then attach the back panel to complete the enclosure.

In one aspect of the invention, a housing for electrical connections and/or an electrical device includes a plurality of walls defining an interior space for housing an electrical device. The plurality of walls include at least one side wall and a back wall orthogonal to the at least one side wall. The back wall includes an opening configured to allow access to the interior space of the housing through a rear side of the back wall. A protrusion extends forward from the back wall into the interior space of the housing, and includes a mounting surface offset from the back wall in a direction toward the interior space of the housing, and a hole formed in the mounting surface, the hole configured to receive a fastener for securing a wire.

In another aspect of the invention, a method for grounding an electrical device in an electrical device housing is provided. A ground wire is secured to an electrical device housing by wrapping a ground wire around a ground screw; inserting the ground screw in a hole formed in a protrusion that extends forward from a back wall of the housing into the interior space of the housing; and tightening the ground screw to secure the ground wire. An electrical device is secured to the housing, and electrically connected to the ground wire.

In another aspect of the invention, an electrical assembly includes a housing and an electrical device. The housing includes a plurality of walls defining an interior space, the plurality of walls including at least one side wall and a back wall orthogonal to the at least one side wall. The back wall includes an opening configured to allow access to the interior space of the housing through a rear side of the back wall. A protrusion extends forward from the back wall into the interior space of the housing, and includes a mounting surface offset from the back wall in a direction toward the interior space of the housing, and a hole formed in the mounting surface. A ground wire is secured to the housing by a ground screw inserted through the hole in the mounting surface of the protrusion in the housing, and an electrical device mounted in the interior space of the housing is electrically connected to the ground wire.

BRIEF DESCRIPTION OF THE DRAWINGS

FIG. 1A is a perspective view of an open back electrical box having a ground screw bump, according to an exemplary embodiment.

FIG. 1B is a frontal view of the electrical box of FIG. 1A, according to an exemplary embodiment.

FIG. 1C is side view of the electrical box of FIG. 1A, according to an exemplary embodiment.

DETAILED DESCRIPTION OF EXEMPLARY EMBODIMENTS

Figure 1E:
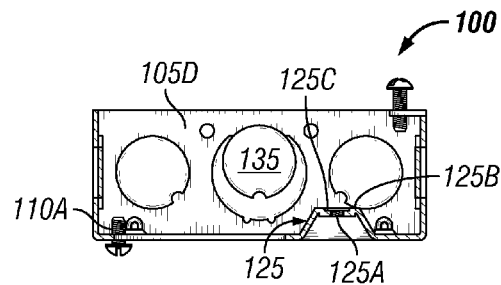
FIG. 1E is a side cross-sectional view of the electrical box of FIG. 1A, taken along section 1E-1E, according to an exemplary embodiment.

The invention may be better understood by reading the following description of non-limiting, exemplary embodiments with reference to the attached drawings wherein like parts of each of the figures are identified by the same reference characters.

The invention relates to an open back electrical box having a ground screw bump in a portion of the back wall.

An electrical housing, receptacle, housing, or box can be made of metal (for example, steel), plastic (for example, PVC), or other material and can provide the structure for an electrical switch (for example, a light switch), outlet, or other connection or use. For example, an electrical box can be an outlet box, a switchbox, a junction box, a ceiling box, a ceiling fan box, or other housing known to one of ordinary skill in the art. The exemplary embodiments describe a box, but the box is not intended to be limited only to a box for housing one light switch, outlet, junction or other connection. Instead, the box may house multiple (in other words, a "gang" of) switches. The box can be any type, include any number of outlets or switches, or provide any other use known to one of ordinary skill in the art.

Figure 1D:
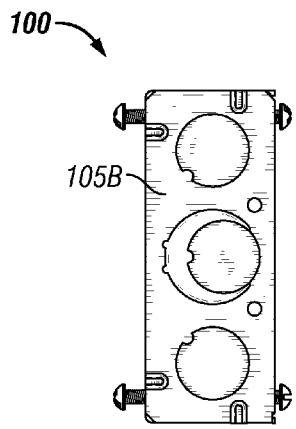
FIG. 1D is another side view of the electrical box of FIG. 1A, according to an exemplary embodiment.

Referring to FIGS. 1A-1E, various views of an open back electrical box having a ground screw bump according to an exemplary embodiment are shown. FIG. 1A shows a perspective view of an exemplary open back electrical box 100, FIG. 1B shows a frontal view of the electrical box 100, FIG. 1C shows a side view of the electrical box 100, FIG. 1D shows another side view of the electrical box 100, and FIG. 1E shows a side cross-sectional view of the electrical box 100, taken along section 1E-1E shown in FIG. 1A.

The box 100 has four side walls 105A, 105B, 105C, 105D, collectively referred to as side walls 105, arranged in a rectangular shape. The box 100 also has a back wall 110 orthogonal to the side walls 105. The back wall 110 has a flat solid portion 115 in a corner therein, and an opening 120. The solid portion 115 includes a raised ground screw protrusion or bump 125 formed therein. In other embodiments, ground screw bump 125 may be formed separately from and coupled to solid portion 115. In still other embodiments, ground screw bump 125 and solid portion 115 may be formed separate from back wall 110, and then coupled to back wall 110.

Ground screw bump 125 may have any suitable shape and size. For example, in the example embodiment of FIGS. 1A-1E, bump 125 has a tapered, generally conical shape. In other embodiments, bump 125 may have a generally cylindrical shape projecting forward from the back wall 110, or a generally rectangular box-shape (e.g., a parallelepiped) projecting forward from the back wall 110, or any other suitable shape.

Figure 1F:
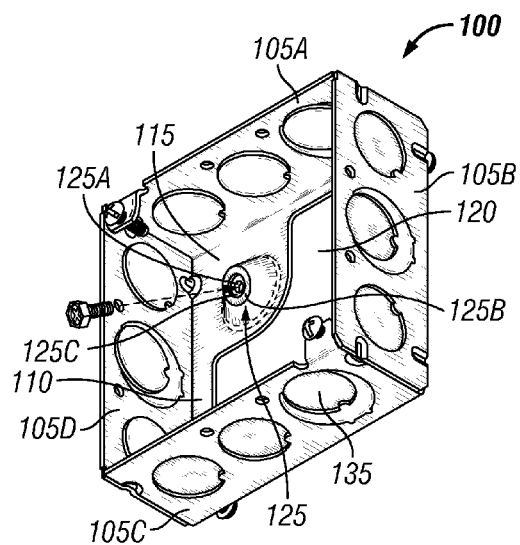
FIG. 1F is a perspective view of an open back electrical box having an alternative ground screw bump, according to an exemplary embodiment.

The ground screw bump 125 includes a threaded hole 125A sized to receive a ground screw 205 (FIGS. 2A-2B) therein. As shown, the hole 125A of the ground screw bump 125 is formed in a mounting surface 125C that surrounds the hole 125A. The mounting surface 125C including the hole 125A may be recessed from a top surface 125B of the ground screw bump 125, or alternatively the hole 125A may be flush with the top surface 125B of the ground screw bump 125. The mounting surface 125C may be offset from the back wall 110 in a forward direction (i.e., towards the front of the box 100). In the exemplary embodiment shown in FIGS. 1A-1E, mounting surface 125C is located in a plane that is parallel to and offset from the back wall 110 in the forward direction, such that when the ground screw 205 is placed therein, the length of the ground screw 205 does not extend beyond the back wall 110. Thus, the distance by which the mounting surface 125C is offset from the back wall 110 may be selected based on the anticipated length of the ground screw 205 to be received in hole 125A (e.g., a ⅜ inch screw). In certain exemplary embodiments, the mounting surface 125C is located in a plane at least about ⅛ inch forward of the back wall 110. In some embodiments, the mounting surface 125C is located in a plane at least about ¼ inch forward of the back wall 110. In other embodiments, the mounting surface 125C is located in a plane at least about ⅜ inch forward of the back wall 110. In other embodiments, as shown in FIG. 1F the mounting surface 125C including the hole 125A may define a plane that is oblique (i.e., non-parallel) to the back wall 110.

The ground screw bump 125 can be formed or shaped during manufacturing of box 100, e.g., by molding or pressing, or can be added or coupled to box 100 after box 100 has been formed. In some embodiments, ground screw bump 125 meets appropriate and necessary requirements of Underwriters Laboratories (UL) and the National Electrical Code (NEC).

A rear cover 122 can be secured to a back wall 110 of the box 100 using fasteners through holes 110A. A front side of the assembled box 100 remains open to accommodate a device 121, such as a switch or an outlet. Side walls 105 can comprise one or more knockouts 135. It is understood that knockouts 135 can be configured along side walls 105 to provide access to the interior of box 100, but knockouts 135 are not intended to be limited to any particular configuration.

Figure 2A:
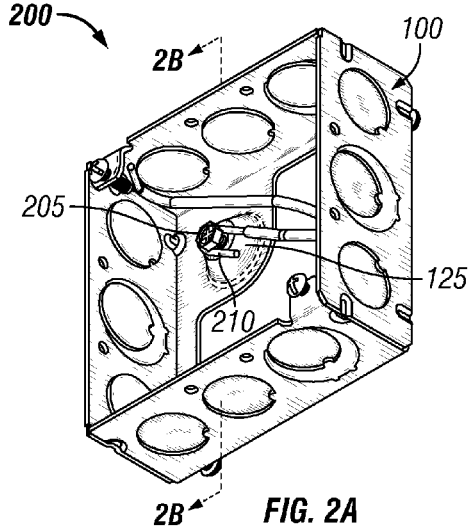
FIG. 2A is a perspective view of an electrical box assembly, showing the electrical box of FIG. 1A coupled to a ground screw and wire, according to an exemplary embodiment.
Figure 2B:
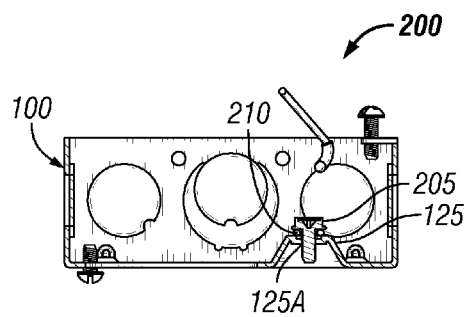
FIG. 2B is a side cross-sectional view of the electrical box assembly of FIG. 2A, taken along section 2B-2B, according to an exemplary embodiment.

Referring to FIGS. 2A-2B, FIG. 2A shows a perspective view of an exemplary electrical box assembly 200, and FIG. 2B shows a side cross-sectional view of the electrical box assembly 200, taken along section 2B-2B shown in FIG. 2A. The electrical box assembly 200 has a ground screw 205 positioned within the hole 125A of the ground screw bump 125 of the electrical box 100. A ground wire 210, for example a copper wire, can be wrapped around the ground screw 205. The ground screw 205 can then be tightened with a screwdriver or other tool to secure the ground wire 210.

Figure 3A:
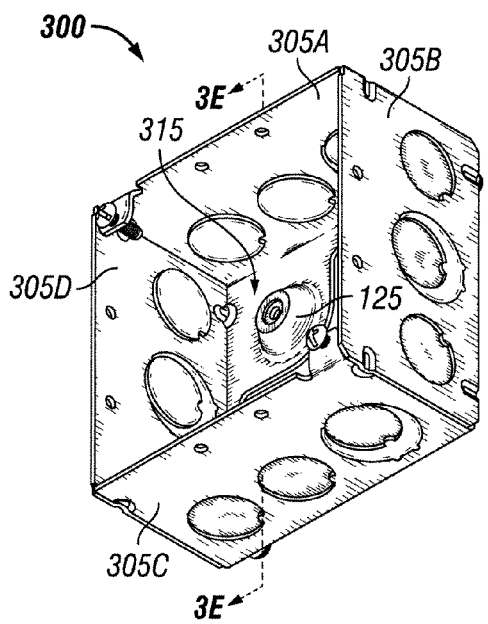
FIG. 3A is a perspective view of another open back electrical box having a ground screw bump, according to an exemplary embodiment.
Figure 3B:
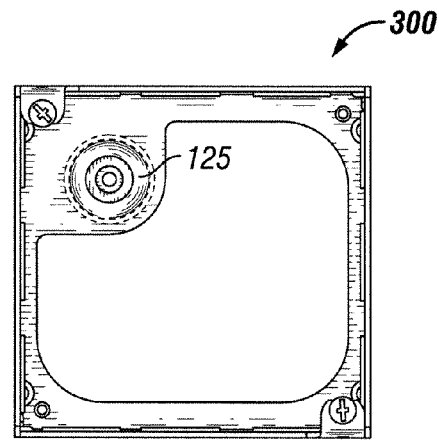
FIG. 3B is a frontal view of the electrical box of FIG. 3A, according to an exemplary embodiment.
Figure 3C:
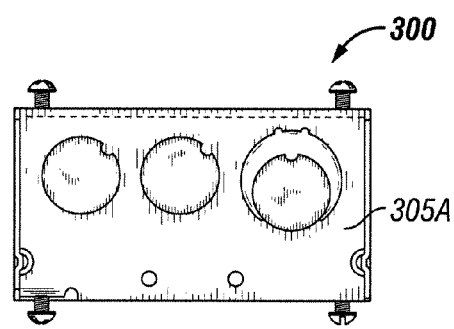
FIG. 3C is side view of the electrical box of FIG. 3A, according to an exemplary embodiment.
Figure 3D:
FIG. 3D is another side view of the electrical box of FIG. 3A, according to an exemplary embodiment.
Figure 3E:
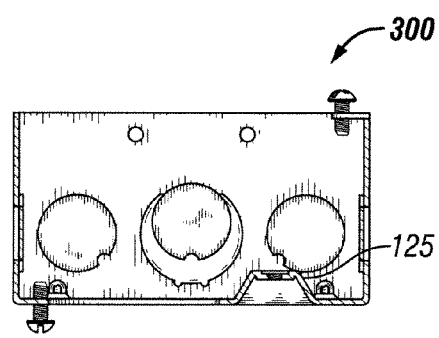
FIG. 3E is a side cross-sectional view of the electrical box of FIG. 3A, taken along section 3E-3E, according to an exemplary embodiment.

Referring to FIGS. 3A-3E, various views of an open back electrical box having a ground screw bump according to another exemplary embodiment are shown. FIG. 3A shows a perspective view of an exemplary open back electrical box 300, FIG. 3B shows a frontal view of the electrical box 300, FIG. 3C shows a side view of the electrical box 300, FIG. 3D shows another side view of the electrical box 300, and FIG. 3E shows a side cross-sectional view of the electrical box 300, taken along section 3E-3E shown in FIG. 3A. The box 300 is similar to the box 100 (FIGS. 1A-1E), but with different dimensions of the side walls of the box. All other components of the box 300 may be similar to the box 100 discussed above with respect to FIGS. 1A-1B, including the ground screw bump 125. The box 300 has four side walls 305A, 305B, 305C, 305D, collectively referred to as side walls 305, arranged in a rectangular shape. The side walls 305 are wider than the side walls 105 (FIGS. 1A-1E), which provides a deeper cavity 315 than the box 100, thereby providing an increased volume to allow for a greater number of conductors and/or other devices herein.

Figure 4A:
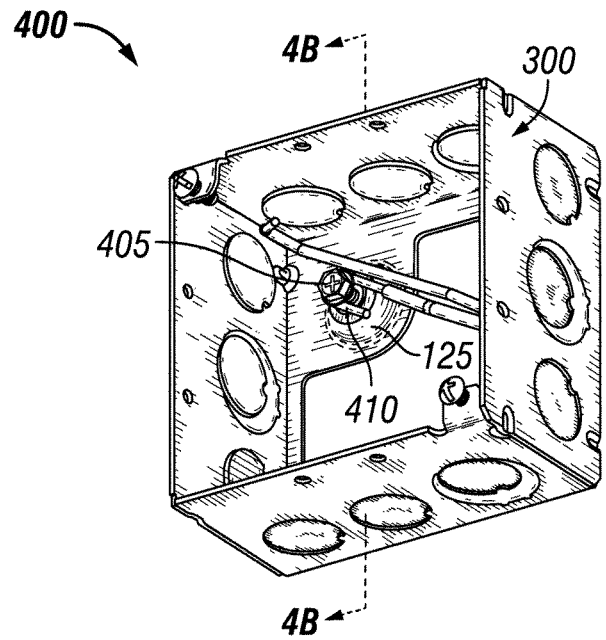
FIG. 4A is a perspective view of another electrical box assembly, showing the electrical box of FIG. 3A coupled to a ground screw and wire, according to an exemplary embodiment.
Figure 4B:
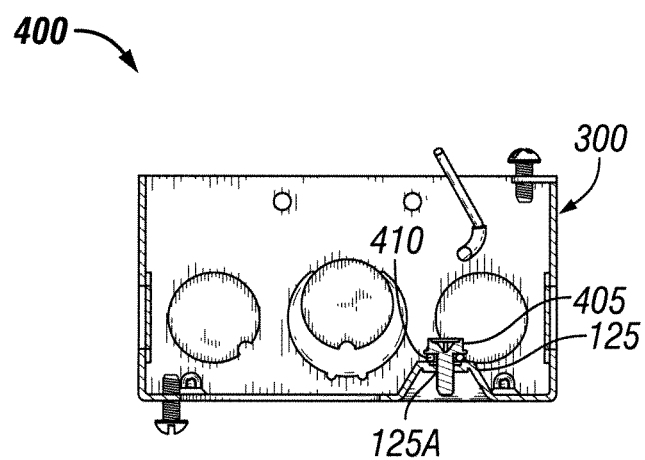
FIG. 4B is a side cross-sectional view of the electrical box assembly of FIG. 4A, taken along section 4B-4B, according to an exemplary embodiment.

Referring to FIGS. 4A-4B, FIG. 4A shows a perspective view of an exemplary electrical box assembly 400, and FIG. 4B shows a side cross-sectional view of the electrical box assembly 400, taken along section 4B-4B shown in FIG. 4A. The electrical box assembly 400 has a ground screw 405 positioned within the hole 125A of the ground screw bump 125 of the electrical box 300. A ground wire 410, for example a copper wire, can be wrapped around the ground screw 405. The ground screw 405 can then be tightened with a screwdriver or other tool to secure the ground wire 410.

Figure 5A:
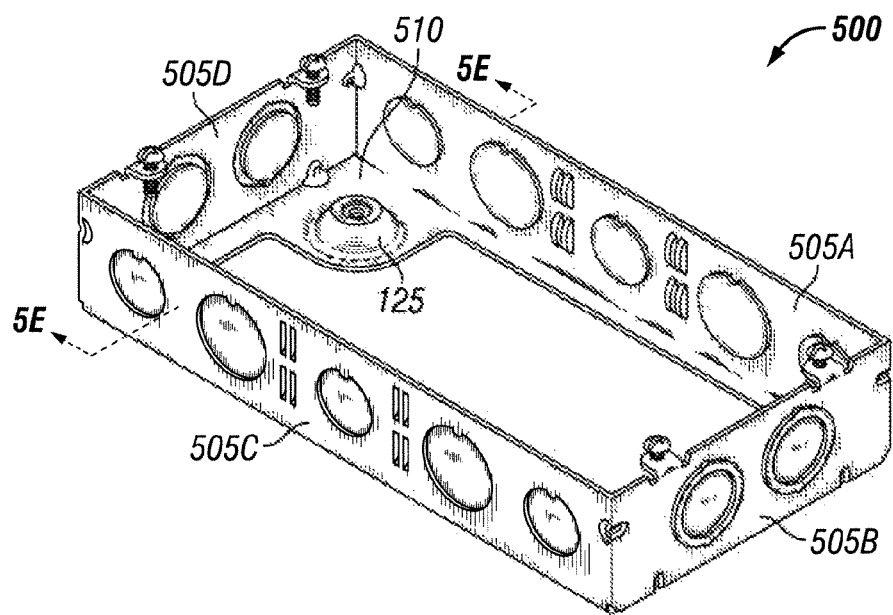
FIG. 5A is a perspective view of yet another open back electrical box having a ground screw bump, according to an exemplary embodiment.
Figure 5B:
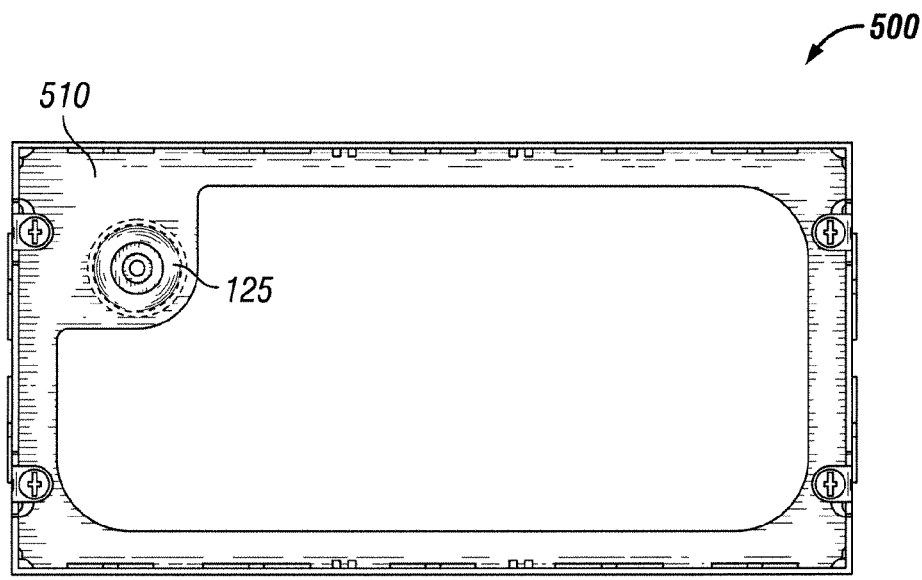
FIG. 5B is a frontal view of the electrical box of FIG. 5A, according to an exemplary embodiment.
Figure 5C:
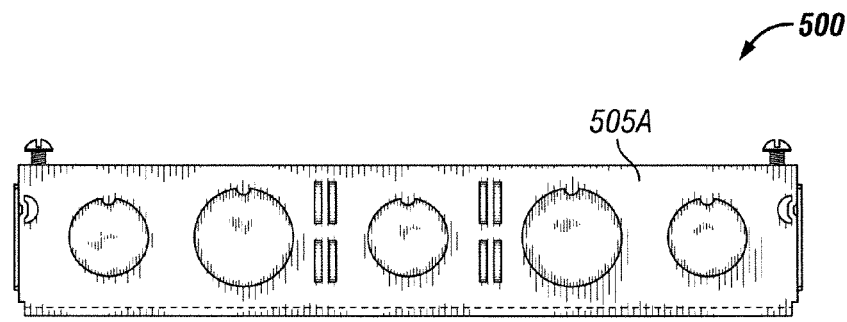
FIG. 5C is side view of the electrical box of FIG. 5A, according to an exemplary embodiment.
Figure 5D:
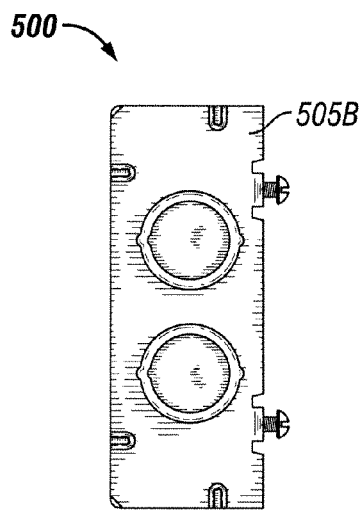
FIG. 5D is another side view of the electrical box of FIG. 5A, according to an exemplary embodiment.
Figure 5E:
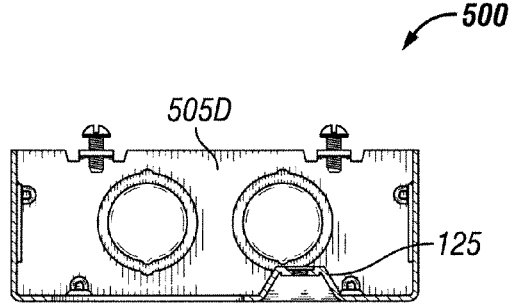
FIG. 5E is a side cross-sectional view of the electrical box of FIG. 5A, taken along section 5E-5E, according to an exemplary embodiment.

Referring to FIGS. 5A-5E, various views of an open back electrical box having a ground screw bump according to yet another exemplary embodiment are shown. FIG. 5A shows a perspective view of an exemplary open back electrical box 500, FIG. 5B shows a frontal view of the electrical box 500, FIG. 5C shows a side view of the electrical box 500, FIG. 5D shows another side view of the electrical box 500, and FIG. 5E shows a side cross-sectional view of the electrical box 500, taken along section 5E-5E shown in FIG. 5A. The box 500 is similar to the box 100 shown in FIGS. 1A-1E, but with different dimensions of the side walls and the back wall of the box. All other components of the box 500 may be similar to the box 100 shown in FIGS. 1A-1E, including the ground screw bump 125. The box 500 has four side walls 505A, 505B, 505C, 505D, collectively referred to as side walls 305, arranged in a rectangular shape. The box 500 also has a back wall 510 orthogonal to the side walls 505. The side walls 505A, 505C are longer than the side walls 105A, 105C shown in FIGS. 1A-1E, thereby providing an elongated rectangular-shaped gang box, which can accept the same types of devices as the boxes 100, 300, as well as low voltage devices such as network ports, data ports, and coaxial connectors, for example. In certain embodiments, a low voltage partition can be used to separate standard voltage from low voltage.

Therefore, the present invention is well adapted to attain the ends and advantages mentioned, as well as those that are inherent therein. The particular embodiments disclosed herein are illustrative only, as the invention may be modified and practiced in different but equivalent manners apparent to those having ordinary skill in the art and having the benefit of the teachings herein. While numerous changes may be made by those having ordinary skill in the art, such changes are encompassed within the spirit and scope of this invention as defined by the appended claims. For example, while the ground screw bump has been shown to have a circular configuration, it is understood that the ground screw bump can be any shape, including oval and square. In addition, the electrical box can have a shape other than square or rectangular. Further, the opening in the back wall of the electrical box can have sharp edges, as opposed to curved edges as shown in the drawings. Furthermore, no limitations are intended to the details of construction or design herein shown. It is therefore evident that the particular illustrative embodiments disclosed above may be altered or modified and all such variations are considered within the scope and spirit of the present invention.

What is claimed is:

1. A housing for electrical connections, the housing comprising:
a plurality of walls defining an interior space for housing an electrical device, the plurality of walls including at least one side wall and a back wall orthogonal to the at least one side wall,
wherein the back wall includes an opening configured to allow access to the interior space of the housing through a rear side of the back wall, and
a protrusion extending forward from the back wall into the interior space of the housing, the protrusion including:
a mounting surface offset from the back wall in a direction toward the interior space of the housing,
a top surface, and
a hole formed in the mounting surface, the hole configured to receive a fastener for securing a wire,
wherein the mounting surface is recessed from the top surface in a direction towards the back wall, and
wherein the mounting surface including the hole that receives the fastener is located in a plane that is oblique to the back wall such that the fastener is inserted into the hole at an angle that is oblique to the back wall.

2. The housing according to claim 1, further comprising a removable rear housing cover.

3. The housing according to claim 1, wherein the mounting surface including the hole is located in a plane that is offset from the back wall by at least about ⅛ inch.

4. The housing according to claim 1, wherein the mounting surface including the hole is located in a plane that is offset from the back wall by at least about ¼ inch.

5. The housing according to claim 1, wherein the mounting surface including the hole is located in a plane that is parallel to the back wall.

6. The housing according to claim 1, wherein the protrusion has a generally conical shape.

7. The housing according to claim 1, wherein the opening in the back wall is sized to allow a person's hand or fingers to access the interior space of the housing through the rear side of the back wall.

8. The housing according to claim 1, wherein the wire is a ground wire, wherein the fastener is a ground screw, wherein the ground wire is secured to the housing by the ground screw extending through the hole in the mounting surface of the protrusion, wherein a leading end of the ground screw extends toward a plane defined by the back wall of the housing, but not beyond the plane defined by the back wall.

9. The housing according to claim 1, wherein the protrusion is formed integrally with the back wall.

10. The housing according to claim 1, wherein the protrusion is located in a corner area of the back wall.

11. The housing according to claim 1, wherein the hole is a threaded hole.

12. The housing according to claim 11, wherein the fastener is threaded.

13. A method for grounding an electrical device in an electrical device housing, the method comprising:
- securing a ground wire to an electrical device housing by:
  - wrapping a ground wire around a ground screw;
  - inserting the ground screw in a hole formed in a mounting surface of a protrusion that extends forward from a back wall of the housing into the interior space of the housing; and
  - tightening the ground screw to secure the ground wire;
- securing an electrical device to the housing; and
- electrically connecting the electrical device to the ground wire,
- wherein the mounting surface is recessed from a top surface of the protrusion in a direction towards the back wall, and
- wherein the hole is formed in a mounting surface that is oblique to the back wall of the housing such that the ground screw is inserted into the hole in a direction at an oblique angle to the back wall.

14. The method according to claim 13, further comprising installing the housing in a wall.

15. The method according to claim 13, further comprising installing a rear cover over the back wall of the housing.

16. The method according to claim 13, wherein tightening the ground screw to secure the ground wire advances a leading end of the screw toward a plane defined by the back wall of the housing, but not beyond the plane defined by the back wall.

17. The method according to claim 13, wherein the hole is formed in a mounting surface that is parallel with the back wall of the housing such that the screw is inserted in a direction generally perpendicular to the back wall.

18. An electrical assembly, comprising:
- a housing including:
  - a plurality of walls defining an interior space, the plurality of walls including at least one side wall and a back wall orthogonal to the at least one side wall;
  - wherein the back wall includes an opening configured to allow access to the interior space of the housing through a rear side of the back wall; and
  - a protrusion extending forward from the back wall into the interior space of the housing, the protrusion including:
    - a mounting surface offset from the back wall in a direction toward the interior space of the housing;
    - a top surface; and
    - a hole formed in the mounting surface;
- a ground wire secured to the housing by a ground screw inserted through the hole in the mounting surface of the protrusion in the housing; and
- an electrical device mounted in the interior space of the housing and electrically connected to the ground wire,
- wherein the mounting surface including the hole that receives the ground screw is located in a plane that is oblique to the back wall such that the ground screw is inserted into the hole at an angle that is oblique to the back wall.

19. The electrical assembly according to claim 18, wherein a leading end of the ground screw extends toward a plane defined by the back wall of the housing, but not beyond the plane defined by the back wall.

* * * * *